United States Patent Office

3,278,617
Patented Oct. 11, 1966

3,278,617
PREPARATION OF DILITHIUM DIHYDRO-
ANTHRACENE INITIATORS
Gerald R. Kahle and Richard J. Sonnenfeld, Bartlesville,
Okla., assignors to Phillips Petroleum Company, a corporation of Delaware
No Drawing. Filed Sept. 11, 1961, Ser. No. 149,476
9 Claims. (Cl. 260—665)

This invention relates to the preparation of polymers of conjugated dienes. In accordance with one aspect, this invention relates to an improved method for preparing organopolylithium polymerization initiators. In accordance with another aspect, this invention relates to the initiator compositions thus prepared and to the use of these initiators in the polymerization of conjugated dienes.

In recent years there has been a great deal of activity in the development of processes for producing olefin polymers. Polymers of monoolefins, such as ethylene and propylene, prepared by these processes have received wide acceptance by many industries. The more recent discovery in the field of diene polymerization of certain so-called stereospecific catalysts, which make possible the formation of polymers having a desired configuration, has aroused considerable interest. The polymers formed by the use of these catalysts, also called polymerization initiators, often have outstanding physical properties which render them equal to or even superior to natural rubber.

Polylithium derivatives of condensed ring aromatic compounds are known to be effective initiators for the polymerization of conjugated dienes either alone, in admixture with each other, or in admixture with other types of polymerizable monomers. These polylithium derivatives, generally regarded as dilithium adducts of the parent hydrocarbons, are ordinarily prepared in the presence of polar solvents such as ethers and this method of preparation is satisfactory so far as adduct formation is concerned. However, a polar solvent is undesirable in polymerization systems for the production of certain types of polymers, e.g. high-cis polyisoprene and low-vinyl polybutadiene. The presence of a polar solvent in the polymerization system causes a decrease in the cis content of polyisoprene and an increase in the vinyl content of polybutadiene.

Although various procedures have either been proposed or employed for the preparation of polylithium initiators, all are known to have one disadvantage or another. For example, the removal of the polar solvent from the initiator composition before polymerization requires several steps which obviously increases the initiator preparation cost. Also, attempts have been made to replace the polar solvent with a suitable polymerization solvent but this, too, obviously increases operating costs.

The present invention is primarily concerned with an improved process for the preparation of organopolylithium derivatives of anthracene and to their subsequent use for the polymerization of conjugated dienes wherein the disadvantages of the prior art initiator preparation processes are obviated.

Accordingly, an object of this invention is to provide novel conjugated diene polymerization initiator compositions.

Another object of this invention is to provide a method for preparing organopolylithium derivatives of anthracene.

A further object of this invention is to provide an improved polymerization process for polymerizing conjugated dienes in the presence of dilithium dihydroanthracene initiators.

Other and further objects and advantages of the invention will become apparent to those skilled in the art upon consideration of the accompanying disclosure and the appended claims.

According to the invention, we have now found that organopolylithium derivatives of anthracenes can be prepared by reacting certain organomonolithium compounds with a dihydroanthracene in a hydrocarbon reaction medium. We have further found that these lithium reaction products, prepared in the absence of polar solvents, are effective initiators for the polymerization of conjugated dienes. We have found that polyisoprene prepared with these initiators has a much higher cis content than that prepared in polymerization systems containing polar solvents such as ethers. Furthermore, we have found that butadiene polymers have a much lower vinyl content than when prepared in polymerization systems containing polar solvents such as ethers.

Anthracene compounds that can be utilized according to the invention include 9,10-dihydroanthracene and alkyl-substituted 9,10-dihydroanthracenes. The total number of carbon atoms in the alkyl substituents preferably does not exceed six, each alkyl group can contain from 1 to 6 carbon atoms and preferably there are no more than three alkyl substituents per dihydroanthracene compound.

Representative examples of suitable dihydroanthracene compounds that can be employed include 9,10-dihydroanthracene,
1-methyl-9,10-dihydroanthracene,
1-ethyl-9,10-dihydroanthracene,
2-n-propyl-9,10-dihydroanthracene,
2-tert-butyl-9,10-dihydroanthracene,
1-ethyl-2-isobutyl-9,10-dihydroanthracene,
2,3-diisopropyl-9,10-dihydroanthracene,
1-n-hexyl-9,10-dihydroanthracene,
1,2,3-trimethyl-9,10-dihydroanthracene,
2,3,6-triethyl-9,10-dihydroanthracene,
1,2-diethyl-9,10-dihydroanthracene,
9,10-dimethyl-9,10-dihydroanthracene,
9-amyl-9,10-dihydroanthracene,
9-n-hexyl-9,10-dihydroanthracene,
1,8-diisopropyl-9,10-dihydroanthracene, and the like.

The organomonolithium compounds employed according to the invention can be represented by the formula RLi wherein R is a hydrocarbon radical selected from the group consisting of saturated aliphatic, saturated cycloaliphatic and monocyclic aromatic radicals containing from 1 to 12, inclusive, carbon atoms.

Representative examples of suitable organomonolithium compounds that can be employed include methyllithium, ethyllithium, isopropyllithium, n-butyllithium, n-hexyllithium, n-octyllithium, n-decyllithium, n-dodecyllithium, 2,3-dimethylbutyllithium, 2,4-diethylhexyllithium, 2,4-di-n-propylhexyllithium, 2,2,4-triethylhexyllithium, 4-phenylbutyllithium, 4-phenylhexyllithium, cyclohexyllithium, 4-methylcyclohexyllithium, cyclopentyllithium, 3-phenylcyclopentyllithium, 3 - phenylcyclohexyllithium, benzyllithium, 4-n-butylphenyllithium, 2,4,6-trimethylphenyllithium, 2,4,6-triethylphenyllithium, and the like.

According to the invention, the reaction of an organomonolithium compound with one of the defined anthracenes is carried out in an inert nonpolymerizable reaction medium comprising a hydrocarbon having from 4 to 10, inclusive, carbon atoms per molecule. Preferably, the hydrocarbon reaction medium is selected from the group consisting of alkanes, cycloalkanes and aromatic compounds containing from 4 to 10 carbon atoms per molecule. However, monoolefin hydrocarbons having from 4 to 10 carbon atoms can also be employed when desired provided these compounds do not polymerize in the presence of the initiators of the invention under the reaction conditions employed. Representative examples of suitable hydrocarbon diluents that can be employed include benzene, toluene, cyclohexane, methylcyclohexane, xylene, n-butane, n-hexane, n-heptane, isooctane, n-decane, 1-hexane, 1-octene, 1-decene, cyclohexene, methylcyclohexene, and the like.

The relative amounts of dihydroanthracene and organomonolithium compound employed in preparing the initiator compositions are conveniently expressed in molar quantities. The mole ratio of organomonolithium compound to dihydroanthracene is generally at least 2:1 (stoichiometric amount) and a slight excess of organomonolithium compound is preferred, for example, a 5 to 15 percent excess. However, larger amounts can be used when desired. The reaction temperature employed for preparing the initiator compositions generally ranges from 0 to 150° C. The reaction time varies with the temperature and will generally be in the range from about 30 minutes to about 200 hours or more. The initiator compositions of the invention are preferably prepared in the presence of an inert atmosphere such as argon, helium, nitrogen, and the like.

The organolithium product formed by the reaction of an organomonolithium compound with a dihydroanthracene is generally regarded as a dilithium compound, i.e. 9,10-dilithium-9-10-dihydroanthracene. The dilithium dihydroanthracene reaction products are only slightly soluble in hydrocarbons and precipitate as they are formed. Since the organomonolithium compound reacted with the dihydroanthracene compound is hydrocarbon soluble, the dilithium dihydroanthracene reaction product and unreacted organomonolithium compound are readily separated. At the conclusion of the reaction the solid dilithium dihydroanthracene product can be separated by any suitable means such as centrifugation or filtration, washed with a suitable hydrocarbon solvent to remove unreacted organomonolithium compound, and then dispersed in a suitable hydrocarbon medium, for example, the polymerization diluent. The dilithium dihydroanthracene product dispersed in the desired hydrocarbon medium is then ready for use as a polymerization initiator.

As indicated above, the initiators of this invention are of particular interest for the production of high-cis polyisoprene and butadiene homopolymers and copolymers in which the conjugated diene portion has a low-vinyl content. The polyisoprene obtained according to the invention has a raw cis content above 65 percent and generally above 70 percent. In general, the polymers which can be prepared according to the invention are those of conjugated dienes containing from 4 to 12 carbon atoms per molecule and preferably those containing from 4 to 8 carbon atoms per molecule.

Representative examples of suitable conjugated dienes that can be employed include 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 2-methyl-3-ethyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2-phenyl-1,3-butadiene, 2,3-diethyl-1,3-butadiene, 2,3-di-n-propyl-1,3-butadiene, 2-methyl-3-isopropyl-1,3-butadiene, and the like. Conjugated dienes containing halogen and alkoxy substituents along the chain can also be employed, such as chloroprene, fluoroprene, 2-methoxy-1,3-butadiene, 2-ethoxy-3-ethyl-1,3-butadiene, and 2-ethoxy-3-methyl-1,3-hexadiene. Conjugated dienes can be polymerized alone or in admixture with each other to form copolymers, or block copolymers. Block copolymers can be prepared from two or more conjugated dienes by charging one compound initially, allowing it to polymerize, and then adding a second conjugated diene, and allowing it to polymerize.

In addition to homopolymers and copolymers of conjugated dienes, copolymers of conjugated dienes with other monomers containing a $CH_2=C<$ group, such as vinyl-substituted aromatic compounds, can be made by the process of this invention. The vinyl-substituted aromatic compounds include styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include 3-methylstyrene (3-vinyltoluene), 3,5-diethylstyrene, 4-n-propylstyrene, 2,4,6-trimethylstyrene, 4-dodecylstyrene, 3-methyl-5-n-hexylstyrene, 4-cyclohexylstyrene, 4-phenylstyrene, 2-ethyl-4-benzylstyrene, 4-p-tolylstyrene, 3,5-diphenylstyrene, 2,4,6-tri-tert-butylstyrene, 2,3,4,5-tetramethylstyrene, 4-(4-phenyl-n-butyl)styrene, 3-(4-n-hexylphenyl)styrene, 4-methoxystyrene, 3,5-diphenoxystyrene, 3-decoxystyrene, 2,6-dimethyl-4-hexoxystyrene, 4-dimethylaminostyrene, 3,5-diethylaminostyrene, 4-methoxy-6-di-n-propylaminostyrene, 4,5-dimethyl-1-vinylnaphthalene, 3-ethyl-1-vinylnaphthalene, 6-isopropyl-1-vinylnaphthalene, 2,4-diisopropyl-1-vinylnaphthalene, 3,6-di-p-tolyl-1-vinylnaphthalene, 6-cyclohexyl-1-vinylnaphthalene, 4,5-diethyl-8-octyl-1-vinylnaphthalene, 3,4,5,6-tetramethyl-1-vinylnaphthalene, 3,6-di-n-hexyl-1-vinylnaphthalene, 8-phenyl-1-vinylnaphthalene, 5-(2,4,6-trimethylphenyl)-1-vinylnaphthalene, 3,6-diethyl-2-vinylnaphthalene, 7-dodecyl-2-vinylnaphthalene, 4-n-propyl-5-n-butyl-2-vinylnaphthalene, 6-benzyl-2-vinylnaphthalene, 3-methyl-5,6-diethyl-8-n-propyl-2-vinylnaphthalene, 4-o-tolyl-2-vinylnaphthalene, 5-(3-phenyl-n-propyl)-2-vinylnaphthalene, 4-methoxy-1-vinylnaphthalene, 6-phenoxy-1-vinylnaphthalene, 3,6-dimethylamino-1-vinylnaphthalene, 7-dihexoxy-2-vinylnaphthalene, and the like. Block or random copolymers of conjugated dienes and vinyl-substituted aromatic compounds can be formed. The presence of a small amount of polar compound encourages random copolymerization between conjugated dienes and vinyl-substituted aromatic compounds.

Block copolymers can also be prepared from conjugated dienes and polar monomers which are introduced after the conjugated diene has polymerized. These polar monomers include vinylpyridines and vinylquinolines such as 2-vinyl-pyridine, 4-vinylpyridine, 3,5-diethyl-4-vinylpyridine, 5-methyl-2-vinylpyridine, 5-n-octyl-2-vinylpyridine, 3-n-dodecyl-2-vinylpyridine, 3,5-di-n-hexyl-4-vinylpyridine, 5-cyclohexyl-2-vinylpyridine, 4-phenyl-2-vinylpyridine, 3,5-di-tert-butyl-2-vinylpyridine, 3-benzyl-4-vinylpyridine, 6-methoxy-2-vinylpyridine, 4-phenoxy-2-vinylpyridine, 4-dimethylamino - 2 - vinylpyridine, 3,5-dimethyl-4-diamyl-amino-2-vinylpyridine, 2-vinylquinoline, 4-vinylquinoline, 2-tert-butyl-4-vinylquinoline, 3-methyl-4-vinylquinoline, 3-cyclohexyl - 4-vinylquinoline, 3-methyl-4-ethoxy-2-vinylquinoline, 1-vinylisoquinoline, 3-vinylisoquinoline, 4-tert-dodecyl - 1-vinylisoquinoline, 3-dimethylamino-3-vinylisoquinoline, 4-benzyl-3-vinylisoquinoline, 4-phenyl-1-vinylisoquinoline, and the like.

Other polar monomers include acrylic and alkacrylic acid esters, nitriles, and N,N-disubstituted amides, such as methyl acrylate, ethyl acrylate, butyl acrylate, methyl methacrylate, ethyl methacrylate, propyl methacrylate, butyl methacrylate, methyl ethacrylate, ethyl ethacrylate, isopropyl ethacrylate, acrylonitrile, methacrylonitrile, N,N - dimethylacrylamide, N,N-diethylmethacrylamide, and the like. Vinylfuran and N-vinylcarbazole can also be used.

When it is desired that the polymer formed exhibit rubbery characteristics the conjugated diene should be employed as a major amount of the monomer polymerized. The initiator compositions prepared according to this invention are particularly valuable in forming these conjugated diene polymers. It should be understood, however, that these initiator compositions can also be used when preparing homopolymers or copolymers of the vinyl substituted aromatic compounds or the polar monomers named. Also, block copolymers can be formed between the vinyl substituted aromatic compounds and these polar monomers.

The polymerization reaction is preferably carried out in the presence of an inert atmosphere such as argon, helium, nitrogen or the like. The polymerization reaction is generally carried out at a temperature ranging from about −100 to about 150° C., preferably from about −75 to about +75° C. The particular temperature employed will depend on both the monomers and the particular initiator employed in preparing the polymers. The pressure employed during polymerization need be only that necessary to maintain the materials in the liquid phase. The amount of initiator employed during the polymerization will vary depending on the polymer prepared and particularly the molecular weight desired. In general, however, the amount of initiator employed will range from about 0.1 to 100 millimoles per 100 grams of monomer with the preferred range being from 0.25 to 30 millimoles per 100 grams of monomer.

The polymerization reaction of the above-defined monomers in the presence of the dilithium anthracene initiators of the invention is carried out in a suitable hydrocarbon diluent such as benzene, toluene, cyclohexane, methylcyclohexane, xylene, n-butane, n-hexane, n-heptane, isooctane, and the like. Generally, the diluent is selected from hydrocarbons, for example, paraffins, cycloparaffins and aromatics containing from 4 to 10 carbon atoms per molecule.

The polymers that are prepared according to the invention range from liquids to rubbery materials. The unquenched polymer solutions can be treated with various reagents to introduce functional groups replacing the terminal lithium atoms on the polymer molecule resulting from the polymerization itself. For example, a polymer in solution can be contacted with carbon dioxide to replace the lithium atoms with —COOH groups. Other functional groups which can be introduced include —SH, —OH, halogen and the like.

As indicated above, the polymer products can range from liquids to rubbery materials and the liquid polymers can subsequently be cured to form solids. The polymers can be compounded by the various methods such as have been used in the past for compounding natural and synthetic rubbers using, for example a roll mill or a Banbury mixer. Reinforcing agents such as carbon black and mineral fillers, plasticizers, vulcanizing agents, vulcanization accelerators, antioxidants, and the like such as have been employed in natural and synthetic rubbers can be used when compounding the rubbery polymers of the invention. The polymers of the invention can be blended with other polymers such as natural rubber, other synthetic rubbers, polyolefins such as polyethylene, and the like. The products of the invention are useful as adhesives, potting compounds, sealants, tread stocks and for making many types of molded objects.

A more comprehensive understanding of the invention can be obtained by referring to the following illustrative examples which are not intended, however, to be unduly limitative of the invention.

EXAMPLE I 9,10-dilithium-9,10-dihydroanthracene was prepared by reacting 0.11 mole of n-butyllithium with 0.05 mole of 9,10-dihydroanthracene in 100 milliliters of toluene. The mixture was placed in a bath at 50° C. and tumbled for 144 hours. The reaction was effected in a nitrogen atmosphere. A solid product formed which was separated by centrifuging the mixture. It was washed with 50 milliliters of toluene and followed by two washings with n-pentane, each time centrifuging and decanting the liquid. Unreacted butyllithium was removed by the washing steps. The solid product was finally dispersed in 100 milliliters of n-pentane. The dispersion had a molarity of 0.306, determined by withdrawing a portion and titrating it with 0.1 N hydrochloric acid.

The 9,10-dilithium-9,10-dihydroanthracene product obtained was employed as the initiator in a series of runs for the polymerization of isoprene in accordance with the following recipe.

| | |
|---|---|
| Isoprene, parts by weight | 100 |
| n-Pentane, part by weight | 1000 |
| Initiator, mhm.[1] | variable |
| Temperature, ° F. | 122 |
| Time, hours | 72 |

[1] Millimoles per 100 grams monomer.

Pentane was charged first, the reactor was purged with nitrogen, isoprene was added, and then the initiator. Results of the runs are shown in the following table:

TABLE I

| Run No. | Initiator, mhm. | Conv., Percent | Cis, Percent | | 3,4-Addition Percent | | Inh.[A] Visc. |
|---|---|---|---|---|---|---|---|
| | | | Raw | Normalized | Raw | Normalized | |
| 1 | 5.0 | 100 | 90.4 | 91.1 | 8.8 | 8.9 | 6.53 |
| 2 | 10.0 | 100 | 82.7 | 90.6 | 8.6 | 9.4 | 8.10 |
| 3 | 30.0 | 100 | 75.0 | 88.5 | 9.8 | 11.5 | 3.15 |

[A] See footnote in Col. 7.

EXAMPLE II

Isoprene was polymerized using the same initiator and polymerization recipe employed in Example I. The temperature was 122° F. and quantitative conversion was reached in 48 hours. Nine runs were made. The initiator level was 3.0 mhm. in six of the runs and 31. mhm. in the others. The polymers were solution blended to give a product with the following properties:

| | |
|---|---|
| Inherent viscosity [A] | 11.09 |
| Gel, percent [B] | 0 |
| Microstructure, percent: | |
|     Cis, raw | 88.8 |
|     Normalized | 92.2 |
|     3,4-addition, raw | 7.5 |
|     Normalized | 7.8 |

[A,B] See footnotes in Col. 7.

The polymer obtained above was compounded, cured, and the physical properties determined. The compounding recipe, processing properties, and physical properties of the cured stock are shown below:

Compounding recipe, parts by weight

| | |
|---|---|
| Rubber (Sample 1049–46E) | 100 |
| High abrasion furnace black | 50 |
| Zinc oxide | 3 |
| Stearic acid | 3 |
| Flexamine [1] | 1 |
| Philrich 5 [2] | 5 |
| Pepton 22 [3] | 1 |
| Sulfur | 2.25 |
| NOBS Special [4] | 0.5 |

Processing properties

| | |
|---|---|
| Compound MS–1½ at 212° F. | 31.5 |
| Extrusion at 195° F.: | |
|     Inches/min. | 71.8 |
|     Grams/min. | 125.0 |
|     Rating (Garvey die) | 10+ |

[1] Physical mixture containing 65% of a complex diarylaminoketone reaction product and 35% of N,N′-diphenyl-p-phenylenediamine.
[2] Aromatic oil.
[3] 2,2′-dibenzamidodiphenyl disulfide.
[4] N-oxydiethylene-2-benzothiazyl sulfenamide.

Physical properties, 45 min. cure at 292° F.

| | |
|---|---|
| $\nu \times 10^4$, moles/cc.[C] | 1.46 |
| 300% modulus, p.s.i.[D] | 1160 |
| Tensile, p.s.i.[D] | 3125 |
| Elongation, percent [D] | 565 |
| Max. tensile at 250° F., p.s.i. | 2130 |
| $\Delta T$,° F.[E] | 43.9 |
| Resilience, percent [F] | 68.4 |
| Shore A hardness | 56.0 |

[C] Swelling method of Kraus, Rubber World 135, 67–73, 254–260 (1956). This value is the number of network chains per unit volume of rubber. The higher the number, the more the rubber is crosslinked (vulcanized).
[D] ASTM D412–51T. Scott Tensile Machine L–6. Tests made at 80° F.
[E] ASTM D623–58. Method A. Goodrich Flexometer, 143 lbs./sq. inch load, 0.175 inch stroke. Test specimen is a right circular cylinder 0.7 inch in diameter and one inch high.
[F] ASTM D–945–55 (modified). Yerzley Oscillograph. Test specimen is a right circular cylinder 0.7 inch in diameter and one inch high.
[G] ASTM D676–55T. Shore Durometer, Type A.

As can be seen from the above data, the rubber had good properties and physical properties of the vulcanizate were also very good.

EXAMPLE III

A polymerization initiator was prepared by the reaction of 0.12 mole of n-butyllithium with 0.05 mole of 9,10-dihydroanthracene in 100 milliliters of cyclohexane. The mixture was agitated while the temperature was maintained at 122° F. (50° C.) for 110 hours. After centrifuging to separate the solid product, the supernatant liquid was decanted and the solid washed with 70 milliliters of toluene. This procedure was repeated after which the solid was washed with 100 milliliters of n-pentane, separated, and finally dispersed in 100 milliliters of n-pentane. The washing procedure was for the purpose of removing unreacted butyllithium. The molarity, determined by 0.1 N hydrochloric acid titration, was 0.155.

The 9,10-dilithium-9,10-dihydroanthracene product obtained was employed as the initiator for the polymerization of isoprene using the quantities of monomer and n-pentane given in Example I and an initiator level of 7.0 mhm. The temperature was 122° F. Quantative conversion was reached in 22.5 hours. The polymer had the following properties:

| | |
|---|---|
| Inherent viscosity [A] | 8.12 |
| Gel., percent [B] | 0 |
| Microstructure, percent: | |
|   cis, raw | 91.9 |
|   3,4-addition, raw | 8.1 |

[A] One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.
[B] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

It has been found that other polycyclic aromatic hydrocarbons do not behave as do the dihydroanthracenes in preparing polymerization initiators according to the invention. An attempt was made to prepare an initiator from dihydrophenanthrene in a manner similar to that used for dihydroanthracene in the above examples. A 7-ounce bottle was charged with 100 ml. of toluene, purged with nitrogen, 9 grams (0.05 mole) of 9,10-dihydrophenanthrene was added and then 37 ml. of 3-molar n-butyllithium in n-heptane (0.11 mole). The temperature was maintained at 122° F. for six days. Evidence of reaction was indicated by the purple color that developed in the mixture. This is the color of the lithium-phenanthrene adduct. All materials were in solution and, therefore, the dihydrophenanthrene reaction product could not be separated from the unreacted butyllithium.

Microstructures in the above examples were determined using a commercial infrared spectrometer. The samples were dissolved in carbon disulfide so as to form a solution containing 25 grams of polymer per liter of solution. Calibrations were based on deproteinized natural rubber as a reference material assuming that it contained 98 percent cis and 2 percent 3,4-addition product. The cis was measured at the 8.9 micron band and 3,4-addition at the 11.25 micron band. In the presence of a high-cis polyisoprene, trans is not detectable since trans is measured at the 8.75 micron band. The raw cis and raw 3,4-addition are converted to normalized values (assuming cis+3,4-addition=100) as follows:

$$\frac{\text{raw cis percent}}{\text{raw cis percent} + \text{raw 3, 4-addition, percent}}(100) =$$

normalized cis percent $$\frac{\text{raw 3, 4-addition, percent}}{\text{raw cis percent} + \text{raw 3, 4-addition, percent}}(100) =$$

normalized 3, 4-addition, percent

As indicated hereinbefore, the polymer solutions obtained as product according to the invention can be treated with various reagents to introduce functional groups on the polymer. However, when desired the polymer solution obtained as product can be treated by other procedures to recover a polymer without functional groups. For example, at the completion of the polymerization reaction, when a batch process is used, the total reaction mixture is then treated to inactivate the catalyst and precipitate the rubbery product. Any suitable method can be utilized for carrying out this treatment of the reaction mixture. In one suitable method a catalyst-inactivating material, such as water or an alcohol, is added to the mixture so as to inactivate the catalyst and cause precipitation of the polymer. The polymer is then separated from the alcohol or water and diluent by any suitable means such as decantation or filtration. It is often preferred to add initially only an amount of the catalyst inactivating material which is sufficient to inactivate the catalyst without causing precipitation of the dissolved polymer. It has also been found to be advantageous to add an antioxidant, such as phenyl-beta-naphthylamine, to the polymer solution prior to precipitation of the polymer. After addition of the catalyst-inactivating agent and the antioxidant, the polymer present in the solution can then be separated by the addition of an excess of a material such as ethyl alcohol or isopropyl alcohol. When the process of the invention is carried out continuously, the total effluent from the reactor can be pumped from the reactor to a catalyst-inactivating zone wherein the reactor effluent is contacted with a suitable catalyst-inactivating material, such as an alcohol. When an alcohol is used as a catalyst-inactivating material, it also functions to precipitate the polymer. In the event other catalyst-inactivating materials are employed, which do not perform this dual role, a suitable material, such as an alcohol, can then be added to precipitate the polymer. It is, of course, to be realized that it is within the scope of the invention to employ other suitable means to recover the polymer from solution. After separation from the solvent mixture and alcohol by filtration or other suitable means, the polymer is dried.

It will be evident to those skilled in the art that many variations and modifications can be practiced upon consideration of the foregoing disclosure. Such variations and modifications are believed to be within the spirit and scope of the present invention.

We claim:
1. A process for the preparation of a dilithium anthracene polymerization initiator composition which comprises contacting a dihydroanthracene compound selected from the group consisting of 9,10-dihydroanthracene and alkyl-substituted 9,10-dihydroanthracenes with a stoichiometric excess of a hydrocarbon monolithium compound having the formula RL$i$ where R is a hydrocarbon radical selected from the group consisting of saturated aliphatic, saturated cycloaliphatic and monocyclic aromatic radicals having from 1 to 12, inclusive, carbon atoms in an inert hydrocarbon reaction medium to form said initiator and precipitate said initiator in said reaction medium as it is formed.

2. A process accordng to claim 1 wherein said anthracene is 9,10-dihydroanthracene.

3. A process for the preparation of a dilithium anthracene polymerization initiator composition which comprises contacting a dihydroanthracene compound selected from the group consisting of 9,10-dihydroanthracene and alkyl-substituted 9,10-dihydroanthracenes wherein each alkyl group contains from 1 to 6, inclusive, carbon atoms with an organomonolithium compound having the formula RL$i$ where R is a hydrocarbon radical selected from the group consisting of saturated aliphatic, saturated cycloaliphatic and monocyclic aromatic radicals having from 1 to 12, inclusive carbon atoms in an inert non-polymerizable hydrocarbon reaction medium selected from alkanes, cycloalkanes and aromatics having from 4 to 10 carbon atoms per molecule in a mole ratio of monolithium compound to anthracene compound of at least 2:1 and at a temperature in the range 0 to 150° C. to form said initiator and precipitate said initiator in said reaction medium as it is formed, and separating said initiator from the reaction mixture as a product of the process.

4. A process according to claim 3 wherein said anthracene is 9,10-dihydroanthracene.

5. A process according to claim 4 wherein said monolithium compound is n-butyllithium.

6. A process for the preparation of 9,10-dilithium-9,10-dihydroanthracene polymerization initiator composition which comprises contacting 9,10-dihydroanthracene with a stoichiometric excess of n-butyllithium in toluene to form said initiator and precipitate said initiator in toluene as it is formed.

7. A process for the preparation of 9,10-dilithium-9,10-dihydroanthracene polymerization initiator composition which comprises contacting 9,10-dihydroanthracene with a stoichiometric excess of n-butyllithium in toluene to form said initiator and precipitate said initiator in toluene as it is formed, separating said initiator from the reaction mixture, and dispersing said initiator n n-pentane.

8. A process for the preparaton of 9,10-dilithium-9,10-dihydroanthracene polymerization initiator composition which comprises contacting 9,10-dihydroanthracene with a stoichiometric excess of n-butyllithium in cyclohexane to form said initiator and precipitate said initiator in cyclohexane as it is formed.

9. A process for the preparation of 9,10-dilithium-9,10-dihydroanthracene polymerization initiator composition which comprises contacting 9,10-dihydroanthracene with a stoichiometric excess of n-butyllithium in cyclohexane to to form said initiator and precipitate said initiator in cyclohexane as it is formed, separating said initiator from the reaction mixture, and dispersing said initiator in n-pentane.

References Cited by the Examiner
UNITED STATES PATENTS

| 3,030,346 | 4/1962 | Cooper | 260—83.7 |

FOREIGN PATENTS

| 218,149 | 8/1958 | Australia. |

OTHER REFERENCES

Coates: G.E. Organo-Metallic Compounds, p. 17, New York, John Wiley & Sons, Inc., Second Edition, 1960.

Mikhailov et al.: Izvest. Akad, Nauk. S.S.S.R., Otdel Khim. Nauk 1949, pp. 279–86 (Lithium Corp. of America Bibliography).

Beckwith et al.: J. Chem. Soc. (London), 1957, pp. 1001–8 (Lithium Corp. of America Bibliography, Jan. 1, 1958, No. 27).

TOBIAS E. LEVOW, *Primary Examiner.*

LEON J. BERCOVITZ, JOSEPH L. SCHOFER,
*Examiners.*

C. R. REAP, T. L. IAPALUCCI, A. DEMERS,
*Assistant Examiners.*